United States Patent [19]

Aignesberger et al.

[11] 3,985,696

[45] Oct. 12, 1976

[54] PROCESS OF PREPARING AQUEOUS SOLUTIONS OF MELAMINE-FORMALDEHYDE CONDENSATION PRODUCTS HAVING ANIONIC SULFO GROUPS

[75] Inventors: Alois Aignesberger, Trostberg; Paul Bornmann, Stein an der Traun; Hans-Gunter Rosenbauer; Hans Theissig, both of Trostberg, all of Germany

[73] Assignee: Suddeutsche Kalkstickstoff-Werke AG, Trostberg, Germany

[22] Filed: Nov. 14, 1974

[21] Appl. No.: 523,555

[30] Foreign Application Priority Data

Nov. 28, 1973 Germany............................ 2359291

[52] U.S. Cl. .................... 260/29.4 R; 260/39 R; 260/39 SB; 260/67.6 R; 260/69 R
[51] Int. Cl.² ........................................... C08L 61/20
[58] Field of Search ............ 260/29.4, 39 R, 39 SB, 260/42.13, 67.6 R, 69 R

[56] References Cited

UNITED STATES PATENTS

| 2,730,516 | 1/1956 | Suen et al. ................... 260/67.6 R |
| 3,121,702 | 2/1964 | Sherr et al. ..................... 260/42.13 |
| 3,240,736 | 3/1966 | Beckwith ..................... 260/29.2 R |

*Primary Examiner*—J. Ziegler
*Attorney, Agent, or Firm*—Hans Berman; Kurt Kelman

[57] ABSTRACT

Aqueous solutions of melamine-formaldehyde and melamine-urea-formaldehyde condensation products having anionic sulfo groups in concentrations as high as 50% by weight may be prepared in a three-stage process. In the first stage, melamine or a mixture of melamine with up to 40 mole-% urea, formaldehyde, and an alkali metal sulfite are condensed in aqueous solution at 60°–80°C and pH 10–13 until the solution is free from readily detectable amounts of sulfite. In the second stage, condensation is continued at pH 3.0–4.5 for 30 to 90 minutes. In the third stage, a temperature of 70° to 95°C and a pH of 7.5 to 9.0 are maintained until a sample of the solution, when diluted to 20% solids by weight, has a viscosity of 5 to 40 centipoises at 20°C.

7 Claims, No Drawings

PROCESS OF PREPARING AQUEOUS SOLUTIONS OF MELAMINE-FORMALDEHYDE CONDENSATION PRODUCTS HAVING ANIONIC SULFO GROUPS

This invention relates to aqueous solutions of melamine-formaldehyde and melamine-urea-formaldehyde condensation products having anionic sulfo groups, and particularly to a process which permits homogeneous solutions of such products having a high solids content to be prepared.

As is known from U.S. Pat. No. 2,730,516, condensation products of melamine and formaldehyde having anionic sulfo groups are water-soluble and do not set at elevated temperature in the manner of otherwise analogous condensation products free from sulfo groups. They are useful as protective colloids, thickening agents, and emulsifiers. The method of the patent, however, does not permit the production of solutions containing more than 25% solids, all percentage values herein being by weight unless stated otherwise.

Another known method disclosed in the published German Patent Application OS No. 1,671,017 condenses amino-s-triazines having at least two amino groups with formaldehyde and alkali metal sulfite, but cannot directly produce aqueous solutions containing more than 20% condensation product on a dry basis. When more concentrated solutions are desired, it is necessary to prepare and recover first a diamine-s-triazinesulfonic acid, and then to condense the acid with formaldehyde.

It is a primary object of this invention to produce concentrated aqueous solutions of melamine-formaldehyde and melamine-urea-formaldehyde condensation products having anionic sulfo groups in a simple, one-step procedure.

It has been found that solutions containing 30 to 50% of the condensation products are readily formed from an aqueous solution of melamine or melamine and urea, formaldehyde, and alkali metal sulfite if the solution is sequentially maintained under three sets of operating conditions.

In the first stage, an aqueous solution of melamine or of a mixture of at least 60 mole percent melamine and not more than 40 mole percent urea, formaldehyde, and an alkali metal sulfite having a pH value of 10 – 13 is held at 60° – 80° C until the presence of sulfite ions is no longer capable of being detected. The amount of formaldehyde is chosen to provide one mole ($\pm$ 10%) formaldehyde for each primary amino group of the melamine and urea present, and the alkali metal sulfite to provide one divalent sulfite ion ($\pm$ 10%) per mole of amine, that is, of melamine and urea.

In the second stage, the pH of the solution is adjusted to a value of 3.0 – 4.5 by means of a mineral acid, that is, an inorganic acid at least as strong as phosphoric acid, and the acidified solution is held at 30° – 60° C for 30 to 90 minutes.

In the third stage, the pH of the solution is increased to 7.5 – 9.0 by means of any convenient alkaline material, and the solution is kept at 70° – 90° C until the viscosity of a sample diluted to 20% solids is between 5 and 40 centipoises at 20° C.

The water content of the aqueous solution in the first stage may be chosen to make the solids content of the ultimate product, as represented by the afore-mentioned sample prior to dilution, 30 to 50%.

While any strong inorganic acid inert to the condensation product may be employed for pH adjustment of the solution produced in the first stage, sulfuric acid is generally preferred if the ultimate condensation product is to be employed for improving the properties of reinforced concrete. Hydrochloric acid, while equally effective in preparing a concentrated solution of the condensation product, enhances corrosion of the reinforcing steel. Phosphoric acid is effective in the process of this invention, but retards setting of a concrete mixture to which the solution of the condensation product is added. Several other strong inorganic acids, while effective, are excluded from consideration by their cost.

It is essential for the success of the process that the condensation reaction in the third stage be continued until a sample shows the properties indicated above, but the solution so produced may be diluted as needed in a specific application. The process permits concentrated solutions to be prepared without isolating intermediates, and without removing water from the ultimate condensation mixture. The concentrated solutions of the invention are stored or transported at lower cost than the more dilute solutions available from the prior art at comparable expense and are produced at much lower cost than the concentrates available heretofore. The shelf life of the concentrated solutions of the invention is equal to that of the known solutions containing 20% solids.

The condensation products of the invention are employed for improving the properties of compositions which solidify by reaction of water with a cementitious material, and for improving the properties of the solidified compositions which may be materials of construction. Thus, the solutions of the invention are employed to advantage in repairing defects in concrete, as liquefiers in concrete mixtures, in adhesive compositions for ceramic particles or glass, in the manufacture of cementitious floor tiles and of concrete blocks, and in the stabilization of soil and other geological strata.

When employed for improving the compressive strength and other properties of structures prepared from mixtures of water, a cementitious material, and an inert filler, the condensate solutions of the invention are used in amounts of 0.1 to 5%, based on the weight of cementitious material in the mixture.

The following Examples are further illustrative of the process of the invention and of the use of the aqueous solutions prepared by the process.

EXAMPLE 1

350 kg Melamine, 280 kg sodium metabisulfite ($Na_2S_2O_5$) and 60 liters 20% sodium hydroxide solution were stirred into 770 liters aqueous 30% formaldehyde solution at room temperature. The aqueous solution so obtained was strongly alkaline (pH 10 – 13) and was held at 75° C for approximately 30 minutes when the solution was found to be free from significant amounts of sulfite, and sulfite ions could no longer be detected by the usual analytical methods.

The solution then was cooled to 50° C and adjusted to pH 3.8 by adding a mixture of 60 liters concentrated sulfuric acid and 900 liters water. The resulting adjusted solution was further held under mild condensation conditions, that is, at a temperature of 50° C, until a sample showed a viscosity of 300 cp at 40° C after somewhat less than 1 hour.

280 Liters 20% sodium hydroxide solution was then added to increase the pH of the solution to 8.0, and the solution was thereafter held at 90° C for about 1 hour when it reached a viscosity of 12 cp at 90° C. The solution was then cooled to ambient temperature and adjusted to pH 8.5.

It contained 34.0% solid condensation product and had a viscosity of 26 cp at 20° C. A sample diluted to 20% solids had a viscosity of 9 cp. This solution was employed in Examples 2 to 4.

EXAMPLE 2

A concrete mixture was prepared from the following solid ingredients:

| | |
|---|---|
| 27.0 kg Sand of particle size | 0 – 4 mm |
| 5.7 kg Sand of particle size | 4 – 8 mm |
| 12.0 kg pebbles of particle size | 8 – 16 mm |
| 18.3 kg pebbles of particle size | 16 – 32 mm |
| 13.0 kg Portland cement PZ 350 F (as defined by German Industrial Standard DIN 1164). | |

Three batches of the solids were mixed with water in respective ratios of 45%, 45%, and 40% based on the weight of the Portland cement. The second and third batches were additionally mixed with 0.9% and 1.5% respectively of the condensate solution of Example 1, again based on the Portland cement weight in the mixtures. The mixtures were then tested for degree of spread according to German Industrial Standard DIN 1048, and gave values of 40 cm, 60 cm, and 60 cm respectively.

EXAMPLE 3

Two sets of test specimens 4 cm × 4 cm × 16 cm were prepared according to the method of German Industrial Standard DIN 1164 from concrete mixtures containing Portland cement PZ 350 F, and respectively containing no condensation product of the invention and 53% water, and 3.3% of the solution prepared in Example 1 and 46% water, based on the cement weight. The degree of spread acc. DIN 1164 (1958) in the wet mixtures was 18 ± 1 cm. The prepared test specimens were stored at 20° C and 65% relative humidity until they were tested for flexural and compressive strength after one day, seven days, and 28 days.

The specimens prepared without the condensation product gave flexural strength values of 21, 52, and 74 kp/cm² after the three storage periods respectively, and compressive strength values of 83, 354, and 450 kp/cm². The corresponding test results for the specimens containing the condensation product of the invention were 57, 67, 96 kp/cm², and 223, 550, and 673 kp/cm².

EXAMPLE 4

Two sets of test specimens 4 cm × 4 cm × 16 cm were prepared according to the method of German Industrial Standard DIN 4208 from synthetic anhydrite AB 200 and standard sand mixture (DIN 1164) in a weight ratio of 1:3. One set of test blocks was prepared with 40% water, based on the anhydrite weight, and without condensate of the invention, and the other set with 30% water and 3.3% condensation product solution, based on the weight of the anhydrite. The two wet mixtures showed degrees of spread acc. DIN 1164 (1958) of 14.0 and 18.5 cm respectively. The test specimens were stored as in Example 3 and tested after 2, 7, and 28 days.

The specimens prepared without the condensation product of the invention gave flexural strength values of 19, 36, and 61 kp/cm² and compressive strength values of 100, 232, and 294 kp/cm². The corresponding test results for the second set of specimens were 33, 60, 98 kp/cm² and 252, 457, 706 kp/cm².

When melamine was replaced in the procedure of Example 1 by up to 40 mole percent urea, and the amount of formaldehyde was reduced by one third in proportion to the melamine replaced by urea, a resin solution not significantly different from that described in Example 1 was obtained and yielded substantially the same results when employed in the procedures of Examples 2 to 4. (The preparation of a melamine-urea-formaldehyde resin is described in Example 5).

Substantially identical strength data were obtained under otherwise comparable conditions when the sodium metabisulfite in the initial condensation mixture was replaced by a stoichiometrically equivalent amount of sodium sulfite. Two moles $Na_2SO_3$ are equivalent to one mole $Na_2S_2O_5$ and form inherently under the conditions of Example 1. Potassium sulfite is equivalent to the sodium sulfite in its effectiveness, but generally more costly. The other strong mineral acids, when used for acidifying the pre-condensate produced in the first stage are equally effective, but not normally desirable for the reasons pointed out above. Alkaline materials other than sodium hydroxide may be employed for increasing pH prior to the third condensation stage, but offer no advantages.

If it is desired to reduce the amount of sulfate ions in the ultimate resin solution, the solution may be chilled to precipitate sodium sulfate which is readily removed by centrifuging. Sulfate may also be removed by employing a calcium hydroxide solution or an aqueous slurry of calcium oxide in the third stage of the process as an alkalinizing agent. The insoluble calcium sulfate may be removed from the finished resin solution in any conventional manner.

As is evident from comparison of Examples 3 and 4, the beneficial effects of the condensate solutions of the invention are not due to a specific chemical action on the cementitious component which reacts with water to solidify the original wet mixture. Improved mechanical properties are found in structures prepared from cementitious material chemically as different as Portland cement and anhydrite. The nature of the inert filler associated with the water and the cementitious material in the initial wet mixture is also irrelevant to the effect of the condensation product evident from the Examples.

EXAMPLE 5

To 500 parts of aqueous 30% formaldehyde solution at room temperature is added with stirring: a homogenous mixture of 151.2 g melamine and 48 g urea, 190 g sodium pyrosulfite ($Na_2S_2O_5$) and 42 parts of aqueous 20% sodium hydroxide solution. The mixture is heated to 75° C and held at this temperature until sulfite ions are no longer detected. Thereafter the mixture is cooled to 50° C, slowly adjusted to pH 3.5 – 3.8 with diluted sulfuric acid and held at 50° C to cause condensation to the necessary viscosity. Then, its pH is adjusted to 8.0 with diluted aqueous sodium hydroxide solution, and it is heated at 90° C until a specimen diluted to 20% solids has a viscosity of 10 cP/20° C.

EXAMPLE 6

537 parts of aqueous, 30% formaldehyde solution was adjusted to pH 3.5 by means of an aqueous 20% sodium hydroxide solution. At room temperature was added a homogenous mixture of 226.8 parts of melamine and 12 parts of urea. The mixture thus obtained was heated to 80° C and held at this temperature until the resulting product was still soluble in water in a ratio of 1 : 1 at 20° C, whereupon the product was cooled to 45° C. A total of 190 parts of sodium pyrosulfite ($Na_2S_2O_5$) and 42 parts of aqueous 20% sodium hydroxide solution was added and finally 266 ml water. The mixture was heated to 80° C and held for 35 minutes at this temperature before being cooled to 65° C and diluted with additional 800 ml of water. At 55° C, its pH was adjusted to 3.1 to 3.3 by careful addition of a 4.5% aqueous sulfuric acid solution whereupon it was heated to 70° C. After the desired viscosity of 150 cP/70° C ± 30 cP has been reached, the acid condensation mixture was adjusted within 5 – 7 minutes to pH 7.5 ± 0.3 by means of aqueous 20% sodium hydroxide solution and heated again to 90° C to obtain a viscosity of 6 cP/90° C. The resulting solution was cooled down and adjusted to pH 8.5.

According to the above description, condensation products were prepared based on:

|  |  | II | III | IV |
|---|---|---|---|---|
| Melamine | parts | 201.6 | 176.4 | 151.2 |
| Urea | '' | 24 | 36 | 48 |
| Formaldehyde 30% | '' | 518 | 500 | 482 |
| Sodium pyrosulfite | '' | 190 | 190 | 190 |

According to the method of German Industrial Standard DIN 1164 test specimens 4 cm × 4 cm × 16 cm were prepared.

Cement: Portland cement 450P(as defined by German Industrial Standard DIN 1164)
  Water-cement-ratio of the mortar: 0.44
  The specimens were stored at 20° C and 65% relative humidity until they were tested for flexural and compressive strength.

| Condensation product according Example 6 Additive | % | Water-cement ratio | Spread according to DIN 1164 (1958) (cm) | Flexural strength after 1 day ($kp/cm^2$) | Compressive strength after 1 day ($kp/cm^2$) |
|---|---|---|---|---|---|
| none | — | 0.44 | 13.6 | 49 | 220 |
| I | 5 | 0.44 | 17.3 | 58 | 257 |
| II | 5 | 0.44 | 16.0 | 56 | 256 |
| III | 5 | 0.44 | 14.5 | 55 | 247 |
| IV | 5 | 0.44 | 15.1 | 56 | 244 |

What is claimed is:

1. A process of preparing an aqueous solution of a melamine-formaldehyde condensation product having anionic sulfo groups which comprises:
   a. dissolving at least one amine selected from the group consisting of melamine and urea, formaldehyde, and an alkali metal sulfite in water in a ratio of 0.9 to 1.1 mole formaldehyde per amino group of said at least one amine, and 0.9 to 1.1 mole alkali metal sulfite per mole of said amine, not more than 40 mole percent of said amine being urea;
   b. holding the temperature of the resulting aqueous solution at 60° to 80° C while maintaining in said solution a pH of 10 to 13 until said solution is free from sulfite;
   c. adding enough of a mineral acid to said sulfite-free solution to adjust the latter to a pH of 3.0 to 4.5;
   d. holding the temperature of the adjusted solution at 30° to 60° C for 30 to 90 minutes;
   e. thereafter adding enough of an alkaline material to said solution to increase the pH thereof to 7.5 to 9.9; and
   f. holding the temperature of the solution of increased pH at 70° to 95° C until the viscosity of a sample diluted to 20% solids by weight is between 5 and 40 centipoises at 20° C.

2. A process as set forth in claim 1, wherein the amount of water in said resulting aqueous solution is sufficient to make the solids content of said sample prior to said diluting thereof 30 to 50% by weight.

3. A process as set forth in claim 2, wherein said mineral acid is sulfuric acid.

4. A method of improving the mechanical properties of structures prepared from a mixture of water, a cementitious material capable of causing solidification of said mixture by reaction with said water, and an inert, solid filler, which comprises adding to said mixture prior to said solidification a solution prepared by the process set forth in claim 1 in an amount of 0.1 to 5.0%, based on the weight of said cementitious material.

5. A method as set forth in claim 1, wherein said cementitious material is Portland cement.

6. A method as set forth in claim 1, wherein said cementitious material is anhydrite.

7. A method as set forth in claim 4, wherein said solution prior to said adding has a solids content of 30 to 50% by weight.

* * * * *

UNITED STATES PATENT AND TRADEMARK OFFICE
CERTIFICATE OF CORRECTION

PATENT NO. : 3,985,696
DATED : October 12, 1976
INVENTOR(S) : Alois Aignesberger et al It is certified that error appears in the above-identified patent and that said Letters Patent are hereby corrected as shown below:

In column 6, line 22, change "9.9" to -- 9.0 --.

Signed and Sealed this

Fourteenth Day of December 1976

[SEAL]

Attest:

RUTH C. MASON
Attesting Officer

C. MARSHALL DANN
Commissioner of Patents and Trademarks